United States Patent
Hiramoto et al.

(10) Patent No.: US 10,704,897 B2
(45) Date of Patent: Jul. 7, 2020

(54) METHOD FOR DETECTING SHAPE OF BUTT JOINT OF WELDED STEEL PIPE, AND QUALITY CONTROL METHOD AND APPARATUS FOR WELDED STEEL PIPES USING THE SHAPE DETECTING METHOD

(71) Applicant: NIPPON STEEL NISSHIN CO., LTD., Tokyo (JP)

(72) Inventors: Takafumi Hiramoto, Amagasaki (JP); Yasuyuki Kino, Takarazuka (JP); Teruo Ehara, Takarazuka (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 0 days.

(21) Appl. No.: 16/470,872

(22) PCT Filed: Jul. 14, 2017

(86) PCT No.: PCT/JP2017/025746
§ 371 (c)(1),
(2) Date: Jun. 18, 2019

(87) PCT Pub. No.: WO2018/116510
PCT Pub. Date: Jun. 28, 2018

(65) Prior Publication Data
US 2019/0323828 A1 Oct. 24, 2019

(30) Foreign Application Priority Data
Dec. 20, 2016 (JP) .................................. 2016-246819

(51) Int. Cl.
*B23K 9/127* (2006.01)
*G01B 11/24* (2006.01)
(Continued)

(52) U.S. Cl.
CPC .............. *G01B 11/24* (2013.01); *B21C 37/08* (2013.01); *B23K 31/003* (2013.01)

(58) Field of Classification Search
CPC .......... G01N 2291/2675; B23K 31/125; B23K 9/095; B23K 26/032; B23K 26/044; B23K 9/0282
See application file for complete search history.

(56) References Cited

U.S. PATENT DOCUMENTS 6,049,059 A * 4/2000 Kim .................... B23K 9/1274
219/124.34
2009/0272722 A1 11/2009 Sbetti et al.
(Continued)

FOREIGN PATENT DOCUMENTS

CN 204788276 U 11/2015
JP S57-137801 A 8/1982
(Continued)

OTHER PUBLICATIONS

International Search Report dated Sep. 19, 2017 for Application No. PCT/JP2017/025746 and English translation.
EPO, Extended European Search Report for the corresponding European patent application No. 17885192.9, dated Dec. 3, 2019.

*Primary Examiner* — Mohamed Charioui
*Assistant Examiner* — Christine Y Liao
(74) *Attorney, Agent, or Firm* — Lucas & Mercanti, LLP

(57) ABSTRACT

The present invention provides a method for detecting a shape of a butt joint of a welded steel pipe. A specific detection range including a butt joint of a welded steel pipe is scanned with a non-contact means to obtain geometric coordinate data. Coordinates of a start point and an end point of the specific detection range, a first selected point located between the start point and the butt joint, and a second selected point located between the butt joint and the end point are selected from the geometric coordinate data. A first (Continued)

approximate circle including the start point, the end point, and the first selected point, and a second approximate circle including the start point, the end point, and the second selected point are calculated. A deviation between the first and the second approximate circles is used as an index representing the shape of the butt joint.

9 Claims, 3 Drawing Sheets

(51) Int. Cl.
    *B21C 37/08*     (2006.01)
    *B23K 31/00*     (2006.01)

(56) References Cited

U.S. PATENT DOCUMENTS

| 2012/0145771 A1* | 6/2012 | Bohlin | B23K 9/1274 |
| | | | 228/102 |
| 2013/0062324 A1* | 3/2013 | Dorsch | B23K 26/032 |
| | | | 219/121.63 |
| 2018/0001422 A1* | 1/2018 | Rajagopalan | B23K 26/044 |

FOREIGN PATENT DOCUMENTS

| JP | 3046530 B2 | 5/2000 |
| JP | 2001-201327 A | 7/2001 |
| JP | 2004117053 A | 4/2004 |
| JP | 2008107156 A | 5/2008 |

\* cited by examiner

METHOD FOR DETECTING SHAPE OF BUTT JOINT OF WELDED STEEL PIPE, AND QUALITY CONTROL METHOD AND APPARATUS FOR WELDED STEEL PIPES USING THE SHAPE DETECTING METHOD

CROSS REFERENCE TO RELATED APPLICATION

This Application is a 371 of PCT/JP2017/025746 filed on Jul. 14, 2017 which in turn, claimed the priority of Japanese Patent Applications No. 2016-246819 filed on Dec. 20, 2016, both applications are incorporated herein by reference.

TECHNICAL FIELD

The present invention relates mainly to a method for detecting the shape of a butt joint of a welded steel pipe, and a quality control method and apparatus for welded steel pipes using the shape detecting method.

A welded steel pipe is produced by forming a steel sheet into an open pipe with abutting edges by roll forming and then welding the edges. If the abutting edges are not precisely aligned with each other before the welding, this misalignment results in a stepped surface of the welded "butt joint". If the height of the step is greater than a predetermined value, the welded steel pipe is judged to be defective. For example, when the height of the step at the butt joint is 0.5% or more of the diameter of the steel pipe, the pipe is judged to be defective.

In a conventional method for detecting such a step, the surface profile of a steel pipe is measured using a non-contact optical sensor or the like, and the profile data is processed to detect a step at the butt joint. In this method, however, a profile data processing technique to be applied is chosen in the expectation that the shape of the step at the butt joint can be observed as a relatively sudden change in gradient from the smooth circular arc of the base material. On the other hand, due to recent advances in steel pipe production technology, the shape of steps at butt joints has changed and their profiles have become smoother. In some profiles, no particularly marked change in gradient from the rest of the base material is observed. In other words, even if a butt joint has a step, the conventional method cannot identify the step as a step and thus cannot judge such a defective pipe as defective.

For example, Patent Literature 1 below discloses the following method (so-called "reference matching"), as a technique capable of solving the above-mentioned problem. In this method: the surface of a steel pipe is irradiated with a fan-shaped light beam or scanned with a spot light beam while the steel pipe is rotated in a circumferential direction; the irradiating fan-shaped sheet of light or the scanning light spot applied to the surface of the steel pipe is detected as an image signal; the detected image signal is subjected to image processing such as removal of noises, restoration of missing parts, and correction of inclination, to obtain image-processed data; thereafter, circular arc data is obtained by fitting a segment of a previously detected circle representing the outer peripheral surface of the steel pipe to the image-processed data and a difference between the image-processed data and the circular arc data is obtained; and when the resulting difference data exceeds a predetermined threshold value for bead detection, it is judged that a ridge corresponding to a weld bead is formed, the width of a range exceeding the threshold value is calculated, and when the width of the range is equal to a bead width within a predetermined tolerance, the ridge is judged to be a weld bead and the position of the ridge is calculated as a weld bead position (corresponding to a butt joint).

In this method, image data obtained using a light section method is not directly used, but this image data is subjected to pre-processing, such as removal of noises and restoration of missing parts, to obtain an accurate image, and it is judged, based on this image, whether a step is formed or not, by a circular arc fitting technique. Thus, even if the step at the butt joint has a smooth profile, it can be detected with high accuracy.

CITATION LIST

Patent Literature

[PTL 1] Japanese Patent No. 3046530

SUMMARY Of INVENTION

Technical Problem

However, the above-described conventional technique has the following drawbacks.

More specifically, the reference matching method disclosed in Patent Literature 1 above requires a high-speed data processor or a complex mechanism because the previously detected circular arc data of the surface of a steel pipe must be stored as reference data, the image signal obtained by irradiating the surface of the steel pipe with a predetermined light beam need be subjected to image processing such as removal of noises, restoration of missing parts, and correction of inclination, and then a difference between a large amount of data generated by the image processing and the reference data need be calculated.

It is therefore a primary object of the present invention to provide a method for detecting the shape of a butt joint of a welded steel pipe, in which a step at the butt joint of the welded steel pipe can be detected with high accuracy even if the step has a smooth profile, without the need for a high-speed data processor or a complex mechanism. It is another object of the present invention to provide a quality control method and apparatus for welded steel pipes, in which a defective steel pipe having an unacceptable step at a butt joint beyond an acceptable level for quality control can be found without fail using the above-mentioned shape detecting method.

Solution to Problem

In order to achieve the above objects, according to a first aspect of the present invention, a method for detecting a shape of a butt joint 12 of a welded steel pipe 10 is configured as follows, for example, as shown in FIG. 1 to FIG. 5.

A shape of a butt joint 12 of a welded steel pipe 10 is detected based on geometric coordinate data L of a specific detection range including the butt joint 12. The geometric coordinate data L is obtained by scanning the specific detection range using a non-contact means 14 and is projected on a two-dimensional plane.

Coordinates of a start point A and an end point D of the specific detection range, a first selected point B located between the start point A and the butt joint 12, and a second selected point C located between the butt joint 12 and the end point D are selected from the geometric coordinate data L.

A first approximate circle α1 that includes the start point A, the end point D, and the first selected point B, and a second approximate circle α2 that includes the start point A, the end point D, and the second selected point C are calculated.

The first approximate circle α1 and the second approximate circle α2 are averaged so as to calculate an imaginary circle V. A maximum deviation of the first approximate circle α1 or the second approximate circle α2 from the imaginary circle V in a thickness direction of the welded steel pipe 10 within the specific detection range is calculated as a difference value T1, and the difference value T1 is used as an index representing the shape of the butt joint 12.

According to a second aspect of the present invention, a method for detecting a shape of a butt joint 12 of a welded steel pipe 10 is configured as follows, for example, as shown in FIG. 1 to FIG. 5.

A shape of a butt joint 12 of a welded steel pipe 10 is detected based on geometric coordinate data L of a specific detection range including the butt joint 12. The geometric coordinate data L is obtained by scanning the specific detection range using a non-contact means 14 and is projected on a two-dimensional plane.

Coordinates of a start point A and an end point D of the specific detection range, a first selected point B located between the start point A and the butt joint 12, and a second selected point C located between the butt joint 12 and the end point D are selected from the geometric coordinate data L.

A first approximate circle α1 that includes the start point A, the end point D, and the first selected point B, and a second approximate circle α2 that includes the start point A, the end point D, and the second selected point C are calculated.

A distance T2 between a center O1 of the first approximate circle α1 and a center O2 of the second approximate circle α2 is calculated, and the distance T2 is used as an index representing the shape of the butt joint 12.

The second aspect of the present invention includes the following.

Instead of the distance T2 between the center O1 of the first approximate circle α1 and the center O2 of the second approximate circle α2, a differential distance T3 in an X-axis direction between the center O1 of the first approximate circle α1 and the center O2 of the second approximate circle α2 and a differential distance T4 in a Z-axis direction between the center O1 and the center O2 are used as indices representing the shape of the butt joint 12.

The first and second aspects of the present invention have the following effects, for example.

When the geometric coordinate data L within the specific detection range is divided into two quadrants along the butt joint 12 as the boundary between the quadrants to calculate the first approximate circle α1 and the second approximate circle α2 corresponding, respectively, to these quadrants, an arithmetic operation is performed using only three coordinate points for each of the first and second approximate circles. Thus, the speed of the arithmetic operation can be increased.

In addition, unlike the conventional reference matching method, the present method neither requires reference data nor performs complex arithmetic operations such as image processing, but instead, uses the coordinate data of the first approximate circle α1 and that of the second approximate circle α2 calculated as described above, as data required for judging the shape of the butt joint 12. Thus, there is no need for a high-speed data processor or a complex mechanism.

A third aspect of the present invention is a quality control method for welded steel pipes 10 using the method for detecting a shape of a butt joint 12 of a welded steel pipe 10 according to the first aspect of the present invention. In this method, "the difference value T1 is compared with a predetermined threshold value so as to judge whether the shape of the butt joint 12 of the welded steel pipe 10 is acceptable or not".

A fourth aspect of the present invention is a quality control method for welded steel pipes 10 using the method for detecting a shape of a butt joint 12 of a welded steel pipe 10 according to the second aspect of the present invention. In this method, "the distance T2 between the center O1 of the first approximate circle α1 and the center O2 of the second approximate circle α2, or the differential distance T3 in the X-axis direction between the center O1 of the first approximate circle α1 and the center O2 of the second approximate circle α2 and the differential distance T4 in the Z-axis direction between the center O1 and the center O2 are compared with respective predetermined threshold values, so as to judge whether the shape of the butt joint 12 of the welded steel pipe 10 is acceptable or not".

According to these aspects of the present invention, an inflection point that occurs at the edge of a step at the butt joint 12 is not used to judge whether the shape of the butt joint 12 is acceptable or not. Therefore, even if the profile of the step at the butt joint 12 is too smooth to identify the inflection point, the geometries of the step at the butt joint 12 can be detected with high accuracy.

"A quality control apparatus for welded steel pipes" according to a fifth aspect of the present invention is an apparatus for performing the method according to the third aspect of the present invention, that is, a quality control apparatus for welded steel pipes 10 configured as follows, for example, as shown in FIG. 1 to FIG. 5.

The apparatus includes a non-contact means 14 including: a light projecting unit 14a configured to irradiate a specific detection range including a butt joint 12 of a welded steel pipe 10 with a fan-shaped light beam or to scan the specific detection range with a spot light beam; and a data output unit 14b configured to receive light reflected from the specific detection range irradiated or scanned with the light beam from the light projecting unit 14a and to output, based on the reflected light, geometric coordinate data L representing changes in position and shape of the butt joint 12.

The apparatus further includes an arithmetic processor 16 including: an approximate circle calculating/processing unit 16b configured to select, from the geometric coordinate data L obtained by the non-contact means 14, coordinates of a start point A and an end point D of the specific detection range, a first selected point B located between the start point A and the butt joint 12, and a second selected point C located between the butt joint 12 and the end point D, to calculate a first approximate circle α1 that includes the start point A, the end point D, and the first selected point B, and a second approximate circle α2 that includes the start point A, the end point D, and the second selected point C, and to average the first approximate circle α1 and the second approximate circle α2 so as to calculate an imaginary circle V and calculate, as a difference value T1, a maximum deviation of the first approximate circle α1 or the second approximate circle α2 from the imaginary circle V in a thickness direction of the welded steel pipe 10; and a judgment processing unit 16c configured to compare the difference value T1 calculated by the approximate circle calculating/processing unit 16b, with a predetermined threshold value, so as to judge whether the shape of the butt joint 12 of the welded steel pipe 10 is acceptable or not.

A sixth aspect of the present invention is an apparatus for performing the method according to the fourth aspect of the present invention, that is, a quality control apparatus for welded steel pipes 10 configured as follows, for example, as shown in FIG. 1 to FIG. 5.

The apparatus includes a non-contact means 14 including: a light projecting unit 14a configured to irradiate a specific detection range including a butt joint 12 of a welded steel pipe 10 with a fan-shaped light beam or to scan the specific detection range with a spot light beam; and a data output unit 14b configured to receive light reflected from the specific detection range irradiated or scanned with the light beam from the light projecting unit 14a and to output, based on the reflected light, geometric coordinate data L representing changes in position and shape of the butt joint 12.

The apparatus further includes an arithmetic processor 16 including: an approximate circle calculating/processing unit 16b configured to select, from the geometric coordinate data L obtained by the non-contact means 14, coordinates of a start point A and an end point D of the specific detection range, a first selected point B located between the start point A and the butt joint 12, and a second selected point C located between the butt joint 12 and the end point D, to calculate a first approximate circle $\alpha 1$ that includes the start point A, the end point D, and the first selected point B, and a second approximate circle $\alpha 2$ that includes the start point A, the end point D, and the second selected point C, and to calculate a distance T2 between a center O1 of the first approximate circle $\alpha 1$ and a center O2 of the second approximate circle $\alpha 2$, or a differential distance T3 in an X-axis direction between the center O1 of the first approximate circle $\alpha 1$ and the center O2 of the second approximate circle $\alpha 2$ and a differential distance T4 in a Z-axis direction between the center O1 and the center O2; and a judgment processing unit 16c configured to compare the distance T2 or the distances T3 and T4 calculated by the approximate circle calculating/processing unit 16b, with respective predetermined threshold values, so as to judge whether the shape of the butt joint 12 of the welded steel pipe 10 is acceptable or not.

ADVANTAGEOUS EFFECTS OF THE INVENTION

According to the present invention, it is possible to provide a method for detecting the shape of a butt joint of a welded steel pipe, in which a step at the butt joint of the welded steel pipe can be detected with high accuracy even if the step has a smooth profile, without the need for a high-speed data processor or a complex mechanism, and a quality control method and apparatus for welded steel pipes, in which a defective steel pipe having an unacceptable step at a butt joint beyond an acceptable level for quality control can be found without fail using the above shape detecting method.

DESCRIPTION OF EMBODIMENTS

Hereinafter, an embodiment of the present invention will be described with reference to drawings.

Figure 1:
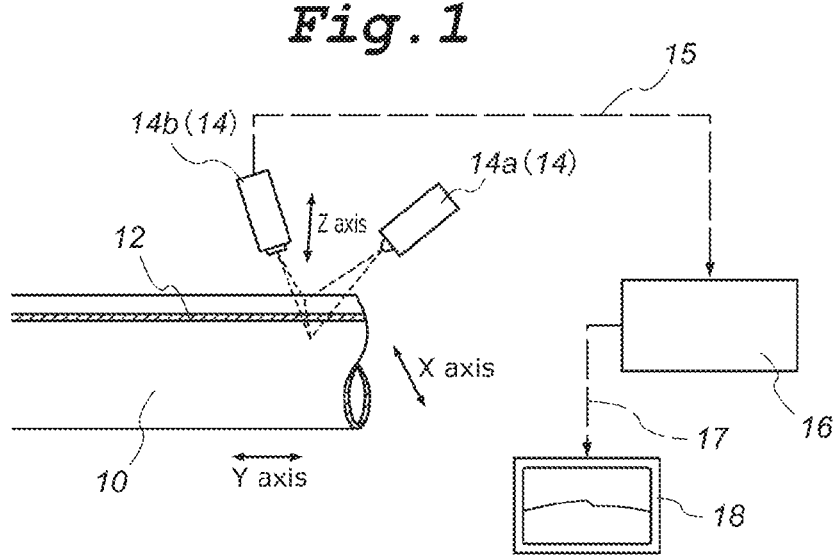
FIG. 1 is a schematic diagram showing an exemplary configuration of a quality control apparatus for welded steel pipes according to the present invention.

FIG. 1 is a schematic diagram showing an exemplary configuration of a quality control apparatus for welded steel pipes according to the present invention. As shown in this figure, the quality control apparatus for welded steel pipes according to an embodiment of the present invention includes a non-contact means 14 and an arithmetic processor 16.

The non-contact means 14 is a device for obtaining coordinate data of the surface profile (i.e., geometric coordinate data L) of the butt joint 12 of the welded steel pipe 10. In the present embodiment, the non-contact means 14 is a non-contact displacement meter including a light projecting unit 14a and a data output unit 14b.

The light projecting unit 14a is a device for irradiating a specific detection range including the butt joint 12 of the welded steel pipe 10 at its center, with a fan-shaped light beam, or scanning the specific detection range with a spot light beam. Specific examples of the light projecting unit 14a include: a device having a slit light source for projecting a linear light beam obtained by focusing light emitted from a light emitter, such as a laser or a lamp, through a cylindrical lens or the like; and a device having a scanning spot light source for projecting a spot light beam to be focused on a target position to scan the butt joint 12 of the welded steel pipe 10 with the spot light beam in a direction approximately perpendicular to the butt joint 12 (i.e., in an X-axis direction), using a mirror or the like. It should be noted that the X-axis direction does not necessarily have to be exactly perpendicular to the butt joint 12 of the welded steel pipe 10, and it may be approximately perpendicular thereto. However, in order to detect a step at the butt joint 12 more clearly, it is preferable that the X-axis direction be exactly perpendicular to the butt joint 12 as much as possible.

The data output unit 14b is a device for receiving light reflected from the specific detection range irradiated or scanned with the light beam from the light projecting unit 14a and outputting, based on the reflected light, geometric coordinate data L representing changes in position and shape of the butt joint 12. This geometric coordinate data L is projected on a two-dimensional plane to represent the shape of the specific detection range including the butt joint 12 at its center. More specifically, the data output unit 14b is a device including a 2D Ernostar lens, a CMOS image sensor, and a microprocessor, and configured to form an image of light diffusely reflected from the surface of the butt joint 12 of the welded steel pipe 10, on photodetectors of the CMOS image sensor, to detect changes in the position and shape of the butt joint 12, and to generate the geometric coordinate data L representing the changes in the position and shape thereof. It should be noted that in the non-contact means 14 including this data output unit 14b, a plurality of geometric coordinate data L corresponding to the longitudinal direction (Y-axis direction) of the welded steel tube 10 are generated in series.

The series of geometric coordinate data L generated by the data output unit 14b is provided to the arithmetic processor 16 through a wire 15.

Figure 5:
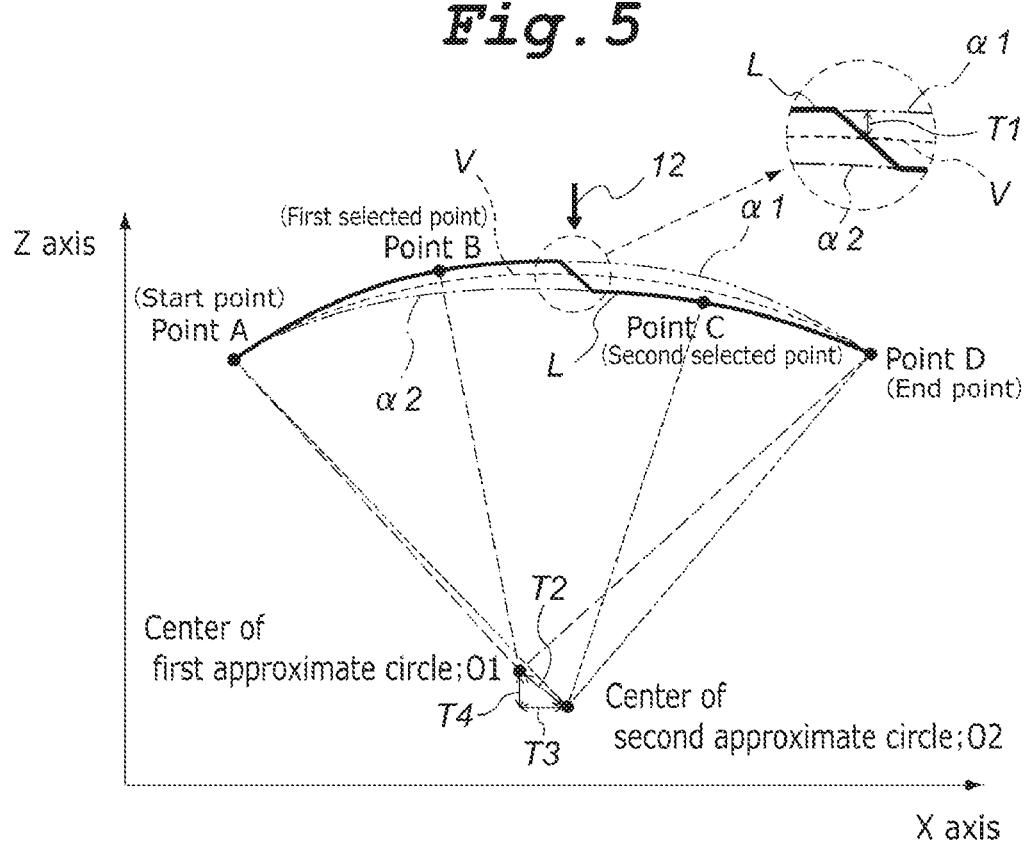
FIG. 5 is a conceptual diagram showing shape detection using a butt joint shape estimation algorithm in the method for detecting the shape of a butt joint of a welded pipe according to the present invention.

In the quality control apparatus for welded steel pipes according to the present invention, the Z axis direction is a direction perpendicular to both the X axis and the Y axis, as shown in FIG. 1. As shown in FIG. 5, in the vicinity of the butt joint 12 of the welded steel pipe 10, the Z axis direction thus defined corresponds to the height direction of the step at the butt joint 12. In the vicinity of the butt joint 12 of the welded steel pipe 10, the Z axis direction thus defined corresponds to the thickness direction of the welded steel pipe 10.

Figure 2:
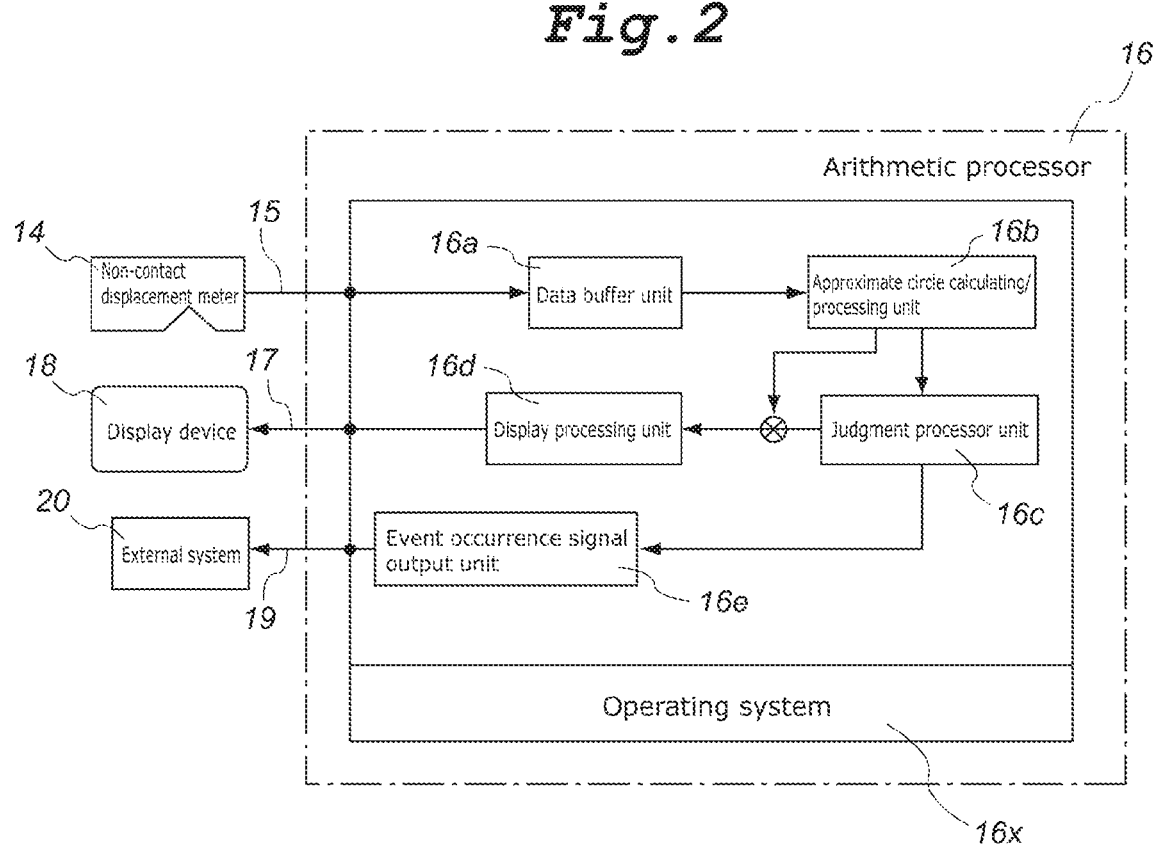
FIG. 2 is a block diagram showing an exemplary configuration of an arithmetic processor in the quality control apparatus for welded steel pipes according to the present invention.

The arithmetic processor 16 is a device mounted in a computer (not shown) and configured to decode instructions and perform arithmetic operations. As shown in FIG. 2, the arithmetic processor 16 includes a data buffer unit 16a, an approximate circle calculating/processing unit 16b, a judgment processing unit 16c, a display processing unit 16d, an event occurrence signal output unit 16e, and a universal operating system 16x, such as Windows (registered trademark) or Linux (registered trademark), for these units.

Data Buffer Unit 16a

The data buffer unit 16a is a memory for temporarily storing the geometric coordinate data L of the butt joint 12 of the welded steel pipe 10 provided in series from the non-contact means 14.

Approximate Circle Calculating/Processing Unit 16b

The approximate circle calculating/processing unit 16b performs the following arithmetic operations on the geometric coordinate data L provided from the data buffer unit 16a.

More specifically, the approximate circle calculating/processing unit 16b divides the geometric coordinate data L into two right and left quadrants along the butt joint 12 located in the center of the specific detection range as the boundary between the quadrants, and selects the coordinates of the start point A and the end point D of the specific detection range, the first selected point B arbitrarily selected from the geometric coordinate data L in the left quadrant, and the second selected point C arbitrarily selected from the geometric coordinate data L in the right quadrant.

Figure 4:
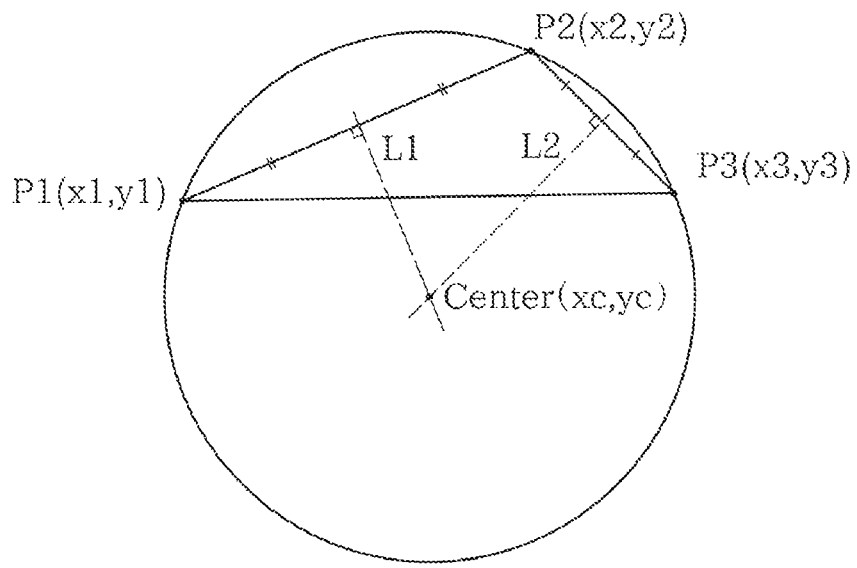
FIG. 4 is a conceptual diagram showing a coordinate determination algorithm for calculating approximate circles in a method for detecting the shape of a butt joint of a welded pipe according to the present invention.

Subsequently, the approximate circle calculating/processing unit 16b calculates a first approximate circle $\alpha1$ that includes the start point A, the end point D, and the first selected point B in the left quadrant, and a second approximate circle $\alpha2$ that includes the start point A, the end point D, and the second selected point C in the right quadrant. In calculating these approximate circles, an algorithm as shown in FIG. 4 is used. More specifically, the approximate circle calculating/processing unit 16b selects predetermined three points (P1, P2, and P3) from the geometric coordinate data L, and calculates a perpendicular line L1 bisecting a line segment (P1, P2) and a perpendicular line L2 bisecting a line segment (P2, P3). Then, it defines, as an approximate circle, a circle centered at the point of intersection of the perpendicular lines L1 and L2 and passing through the points P1, P2, and P3.

By applying this process to the present embodiment, the first approximate circle $\alpha1$ can be calculated using the three points, i.e., the start point A, the first selected point B, and the end point D, according to the algorithm shown in FIG. 4. Likewise, the second approximate circle $\alpha2$ can be calculated using the three points, i.e., the start point A, the second selected point C, and the end point D, according to the algorithm shown in FIG. 4.

Then, the approximate circle calculating/processing unit 16b averages these first and second approximate circles $\alpha1$ and $\alpha2$ to calculate an imaginary circle V. For example, the imaginary circle V may be calculated in such a manner that a midpoint between the center O1 of the first approximate circle $\alpha1$ and the center O2 of the second approximate circle $\alpha2$ is determined as the center of the imaginary circle V, and the average of the radius of the first approximate circle $\alpha1$ and the radius of the second approximate circle $\alpha2$ is determined as the radius of the imaginary circle V.

In this description, "selecting the coordinates of the point A" means that the x and z coordinates of the point A are determined on a two-dimensional coordinate plane with x and z axes, as shown in FIG. 5.

Likewise, in this description, "calculating the first approximate circle $\alpha1$" means that the x and z coordinates of the center O1 of the first approximate circle $\alpha1$ and the radius of the first approximate circle $\alpha1$ are determined on a two-dimensional coordinate plane with x and z axes, as shown in FIG. 5.

Next, there are the following two main methods for obtaining a deviation between the first approximate circle $\alpha1$ and the second approximate circle $\alpha2$ on a two-dimensional coordinate plane (see FIG. 5).

In the first method, the first approximate circle $\alpha1$ and the second approximate circle $\alpha2$ are averaged to calculate the imaginary circle V, the maximum deviation of the first approximate circle $\alpha1$ (or the second approximate circle $\alpha2$) from the imaginary circle V in the thickness direction of the welded steel pipe 10 within the specific detection range is calculated as a difference value T1, and the difference value T1 is used as an index representing the shape of the butt joint 12.

FIG. 5 shows the method in which the maximum deviation of the first approximate circle $\alpha1$ from the imaginary circle V in the thickness direction of the welded steel pipe 10 within the specific detection range is used as the difference value T1. However, the maximum deviation of the second approximate circle $\alpha2$ from the imaginary circle V in the thickness direction of the welded steel pipe 10 within the specific detection range may be used as the difference value T1, or both of these difference values T1 may be used together.

In the second method, the distance T2 between the center O1 of the first approximate circle $\alpha1$ and the center O2 of the second approximate circle $\alpha2$ is calculated and the distance T2 is used as an index representing the shape of the butt joint 12. Alternatively, instead of the above-mentioned distance T2, the differential distance T3 in the X-axis direction between the center O1 of the first approximate circle $\alpha1$ and the center O2 of the second approximate circle $\alpha2$ and the differential distance T4 in the Z-axis direction between the center O1 and the center O2 are calculated, and these distances T3 and T4 are used as indices representing the shape of the butt joint 12 (see FIG. 5).

Unlike the first method described above, the imaginary circle V is not calculated in the second method. In addition, instead of the difference value T1 as the maximum deviation in the thickness direction of the welded steel pipe 10, the distance T2 between the center O1 of the first approximate circle α1 and the center O2 of the second approximate circle α2 or the differential distance T3 in the X-axis direction therebetween and the differential distance T4 in the Z-axis direction therebetween are used as indices representing the shape of the butt joint 12.

Then, the approximate circle calculating/processing unit 16b provides the difference value T1 between the imaginary circle V and the first approximate circle α1 or the second approximate circle α2, as an index representing the shape of the butt joint 12, to the judgment processing unit 16c and the display processing unit 16d. Alternatively, the approximate circle calculating/processing unit 16b provides the distance T2 between the center O1 of the first approximate circle α1 and the center O2 of the second approximate circle α2, or the differential distance T3 in the X-axis direction therebetween and the differential distance T4 in the Z-axis direction therebetween, as indices representing the shape of the butt joint 12, to the judgment processing unit 16c and the display processing unit 16d.

Judgment Processing Unit 16c

The judgment processing unit 16c is configured to compare the deviations, such as the difference value T1 and the distance T2, calculated by the approximate circle calculating/processing unit 16b, with predetermined threshold values, to judge whether the shape of the butt joint 12 of the welded steel pipe 10 is acceptable or not.

For example, assume that a steel pipe with a diameter of 101.6 mm, having a butt joint step with a height of 0.5% or more of the outer diameter of the steel pipe, should be judged to be defective based on certain criteria. In this case, when the difference value T1 is used as an index representing the shape of the butt joint 12 of the welded steel pipe 10, a threshold value of 0.25 mm can be used. When the distance T2 is used as an index representing the shape of the butt joint 12 of the welded steel pipe 10, a threshold value of 0.72 mm can be used. Furthermore, when the distances T3 and T4 are used as indices representing the shape of the butt joint 12 of the welded steel pipe 10, a threshold value of 0.51 mm and a threshold value of 0.518 mm can be used for T3 and T4, respectively. It should be noted that the distance T3 and the distance T4 do not necessarily have to be used together. For example, only the distance T3 or only the distance T4 may be used for judgment.

This judgment processing unit 16c judges that the steel pipe is defective when the deviation exceeds the threshold value, and provides a signal indicating the judgment to the display processing unit 16d and the event occurrence signal output unit 16e.

Display Processing Unit 16d

The display processing unit 16d is connected to a display device 18 such as a monitor through a wire 17 and is configured to convert the data provided from the approximate circle calculating/processing unit 16b and the judgment processing unit 16c into a format that can be displayed on the display device 18.

Event Occurrence Signal Output Unit 16e

The event occurrence signal output unit 16e is connected to an external system 20 such as a rotating warning lamp or a warning buzzer, through a wire 19, and is configured to provide a predetermined event occurrence signal to the external system based on the judgment of acceptance or rejection of the butt joint 12 of the welded steel pipe 10 made by the judgment processing unit 16c. For example, when the judgment processing unit 16c judges that the quality of the butt joint 12 is not acceptable, the event signal occurrence output unit 16e transmits an event occurrence signal to the external system 20 such as a rotating warning lamp or a warning buzzer to activate the external system 20, so as to inform the operator of the occurrence of a defective product.

Figure 3:
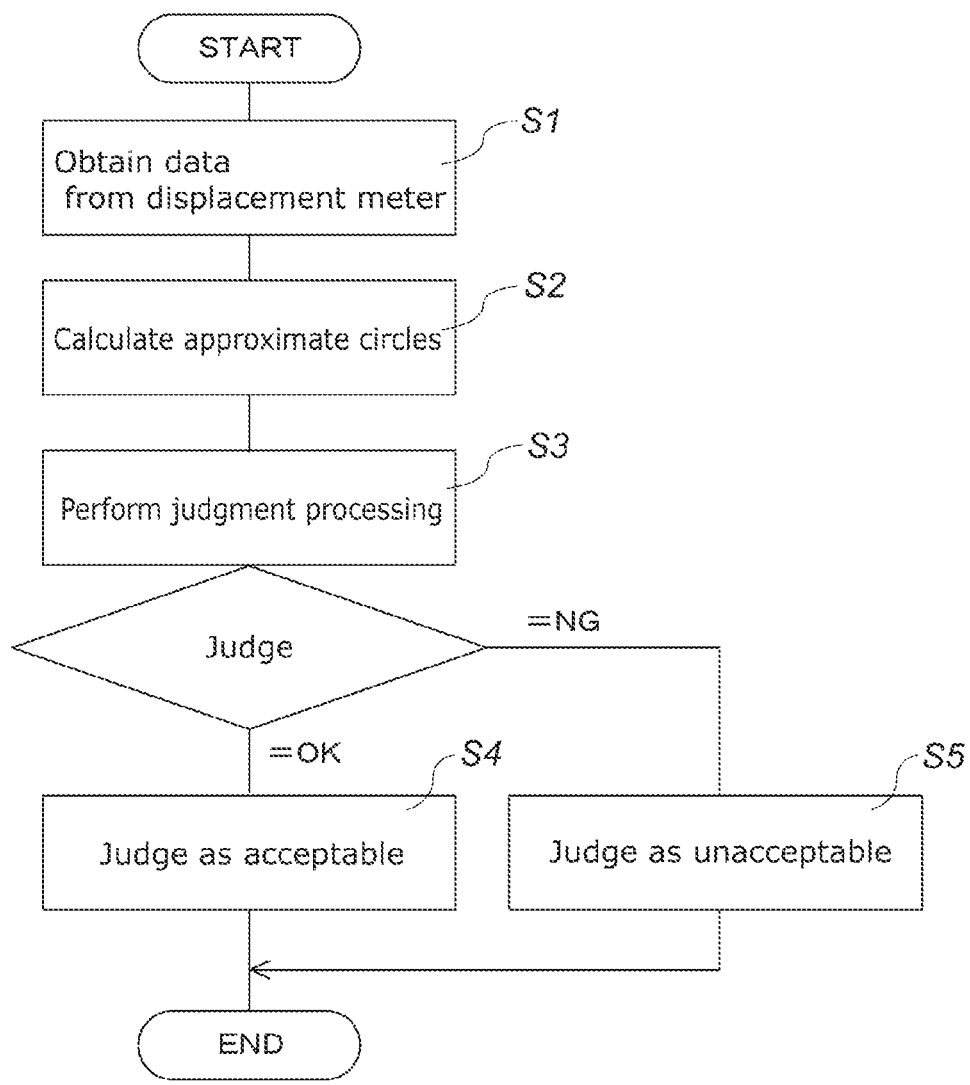
FIG. 3 is a flowchart showing an example of a quality control method for welded steel pipes according to the present invention.

Next, when quality control is performed for the butt joint 12 of the welded steel pipe 10 using the quality control apparatus configured as described above for the welded steel pipe 10, the shape detecting method for the butt joint 12 of the welded steel pipe 10 according to the present invention and the quality control method using the shape detecting method are performed in this order, as shown in the flow shown in FIG. 3.

More specifically, in Step S1 in FIG. 3, the specific detection range including the butt joint 12 of the welded steel pipe 10 at its center is scanned with the non-contact means 14 to obtain the geometric coordinate data L of that range projected on a two-dimensional plane, and the data L is provided to the data buffer unit 16a of the arithmetic processor 16 through the wire 15.

Subsequently, in Step S2 in FIG. 3, the above-mentioned geometric coordinate data L is provided from the data buffer unit 16a to the approximate circle calculating/processing unit 16b, where the geometric coordinate data L is divided into two right and left quadrants along the butt joint 12 located in the center of the specific detection range as the boundary between the quadrants, and the coordinates of the start point A and end point D of the specific detection range, the first selected point B arbitrarily selected from the geometric coordinate data L in the left quadrant, and the second selected point C arbitrarily selected from the geometric coordinate data L in the right quadrant (see FIG. 5) are selected, as described above. Subsequently, the first approximate circle α1 that includes the start point A, the end point D, and the first selected point B in the left quadrant, and the second approximate circle α2 that includes the start point A, the end point D, and the second selected point C in the right quadrant are calculated using the algorithm shown in FIG. 4, and a deviation between the first approximate circle α1 and the second approximate circle α2 on the two-dimensional coordinate plane is obtained. Then, this data, as an index representing the shape of the butt joint 12, is provided to the judgment processing unit 16c.

Then, in Step S3 in FIG. 3, the judgment processing unit 16c compares the deviation between the first approximate circle α1 and the second approximate circle α2 on the two-dimensional coordinate plane, with a predetermined threshold value, as described above, to judge whether the shape of the butt joint 12 of the welded steel pipe 10 is acceptable or not. When the shape of the butt joint 12 is acceptable, it is judged to be acceptable, which means a good product, in Step S4. On the contrary, when the shape of the butt joint 12 is not acceptable, it is judged to be unacceptable, which means a defective product, in Step S5. More specifically, the event signal occurrence output unit 16e transmits an even occurrence signal to the external system 20 such as a rotating warning lamp or a warning buzzer to activate the external system 20, so as to inform the operator of the occurrence of a defective product, as described above.

Here, welded steel pipes with a diameter of 50.8 mm (and a thickness of 1.2 mm) were produced on an actual welded steel pipe production line equipped with a laser welder. The welded steel pipes were produced under quality control using a commercially available high-precision 2D laser displacement meter as a quality control apparatus, and pipes having a step with a height of 0.25 mm or more were judged to be defective based on an acceptance/rejection criterion (or a threshold value). As a result, a total of 46,246 pipes were inspected and 6 defective pipes were not rejected due to inspection error, which means that the inspection error rate was 0.01%. In contrast, in producing welded steel pipes, the arithmetic processor in the quality control apparatus was replaced by the arithmetic processor 16 of the present embodiment, and a threshold value of 0.13 mm was used as the difference value T1, a threshold value of 0.36 mm was used as the distance T2, and threshold values of 0.25 mm and 0.25 mm were used as the distances T3 and T4, respectively. As a result, a total of 16,417 pipes were inspected and defective pipes were all rejected, which means that the inspection error rate was 0.00%.

In the above embodiment, a light projecting unit 14a was used as the non-contact means 14. However, this non-contact means 14 may be any type of means as long as the coordinate data of the surface profile (i.e., the geometric coordinate data L) of the butt joint 12 of the welded steel pipe 10 can be obtained using the means. The light projecting unit 14a may be replaced by an ultrasonic generator or a radar.

The welding method for the welded steel pipe 10 to which the method and apparatus according to the present invention is to be applied is not particularly limited. For example, various welding methods, such as high-frequency welding, arc welding, plasma welding, and laser beam welding, may be used.

Furthermore, in the above embodiment, the specific detection range including the butt joint 12 at its center is selected. However, this specific detection range may be any range as long as it includes the butt joint 12 (at a point other than the start point A and the end point D), and is not limited to that in the above embodiment.

REFERENCE SIGNS LIST

10: Welded steel pipe
12: Butt joint
14: Non-contact means
14a: Light projecting unit
14b: Data output unit
16: Arithmetic processor
16b: Approximate circle calculating/processing unit
16c: Judgment processing unit
A: Start point (of specific detection range)
B: First selected point
C: Second selected point
D: End point (of specific detection range)
L: Geometric coordinate data
V: Imaginary circle
O1: Center (of first approximate circle)
O2: Center (of second approximate circle)
α1: First approximate circle
α2: Second approximate circle
T1: Difference value
T2: Distance (between O1 and O2)
T3: Differential distance (in X-axis direction between O1 and O2)
T4: Differential distance (in Z-axis direction between O1 and O2)

The invention claimed is:

1. A method for detecting a shape of a butt joint of a welded steel pipe, the method comprising:
   irradiating, by a light projecting unit, a specific detection range including a butt joint of a welded steel pipe, using one of a fan-shaped light beam and a spot light beam;
   receiving, by a data output unit comprising a lens and an image sensor, light reflected from the specific detection range;
   generating, based on the reflected light, geometric coordinate data representing changes in position and shape of the butt joint;
   selecting, by a processor, from the geometric coordinate data, coordinates of a start point and an end point of the specific detection range, a first selected point located between the start point and the butt joint, and a second selected point located between the butt joint and the end point;
   calculating, by the processor, a first approximate circle that includes the start point, the end point, and the first selected point, by performing the following steps:
      determining a first line between the start point and the first selected point and a second line between the first selected point and the end point;
      determining a first perpendicular line that is perpendicular to and bisects the first line and a second perpendicular line that is perpendicular to and bisects the second line;
      determining a first intersection point where the first perpendicular line and the second perpendicular line intersect; and
      defining the first approximate circle having a first center at the first intersection point and passing through the start point, the end point and the first selected point; and
   calculating, by the processor, a second approximate circle that includes the start point, the end point, and the second selected point, by performing the following steps:
      determining a third line between the start point and the second selected point and a fourth line between the second selected point and the end point;
      determining a third perpendicular line that is perpendicular to and bisects the third line and a fourth perpendicular line that is perpendicular to and bisects the fourth line;
      determining a second intersection point where the third perpendicular line and the fourth perpendicular line intersect; and
      defining the second approximate circle having a second center at the second intersection point and passing through the start point, the end point and the second selected point; and
   averaging, by the processor, the first approximate circle and the second approximate circle so as to calculate an imaginary circle, calculating, as a difference value, a maximum deviation of the first approximate circle or the second approximate circle from the imaginary circle in a thickness direction of the welded steel pipe within the specific detection range, and using the difference value as an index representing the shape of the butt joint.

2. The quality control method for welded steel pipes using the method for detecting a shape of a butt joint of a welded steel pipe according to claim 1, further comprising:
   comparing the difference value with a predetermined threshold value so as to judge whether the shape of the butt joint of the welded steel pipe is acceptable or not.

3. A method for detecting a shape of a butt joint of a welded steel pipe, the method comprising:
  irradiating, by a light projecting unit, a specific detection range including a butt joint of a welded steel pipe, using one of a fan-shaped light beam and a spot light beam;
  receiving, by a data output unit comprising a lens and an image sensor, light reflected from the specific detection range;
  generating, based on the reflected light, geometric coordinate data representing changes in position and shape of the butt joint;
  selecting, by a processor, from the geometric coordinate data, coordinates of a start point and an end point of the specific detection range, a first selected point located between the start point and the butt joint, and a second selected point located between the butt joint and the end point;
  calculating, by the processor, a first approximate circle that includes the start point, the end point, and the first selected point, by performing the following steps:
    determining a first line between the start point and the first selected point and a second line between the first selected point and the end point;
    determining a first perpendicular line that is perpendicular to and bisects the first line and a second perpendicular line that is perpendicular to and bisects the second line;
    determining a first intersection point where the first perpendicular line and the second perpendicular line intersect; and
    defining the first approximate circle having a first center at the first intersection point and passing through the start point, the end point and the first selected point; and
  calculating, by the processor, a second approximate circle that includes the start point, the end point, and the second selected point, by performing the following steps:
    determining a third line between the start point and the second selected point and a fourth line between the second selected point and the end point;
    determining a third perpendicular line that is perpendicular to and bisects the third line and a fourth perpendicular line that is perpendicular to and bisects the fourth line;
    determining a second intersection point where the third perpendicular line and the fourth perpendicular line intersect; and
    defining the second approximate circle having a second center at the second intersection point and passing through the start point, the end point and the second selected point; and
  calculating, by the processor, a distance between the first center of the first approximate circle and the second center of the second approximate circle, and using the distance as an index representing the shape of the butt joint.

4. The quality control method for welded steel pipes using the method for detecting a shape of a butt joint of a welded steel pipe according to claim 3, further comprising:
  comparing the distance between the first center of the first approximate circle and the second center of the second approximate circle, with a predetermined threshold value, so as to judge whether the shape of the butt joint of the welded steel pipe is acceptable or not.

5. A method for detecting a shape of a butt joint of a welded steel pipe, the method comprising:
  irradiating, by a light projecting unit, a specific detection range including a butt joint of a welded steel pipe, using one of a fan-shaped light beam and a spot light beam;
  receiving, by a data output unit comprising a lens and an image sensor, light reflected from the specific detection range;
  generating, based on the reflected light, geometric coordinate data representing changes in position and shape of the butt joint;
  selecting, by a processor, from the geometric coordinate data, coordinates of a start point and an end point of the specific detection range, a first selected point located between the start point and the butt joint, and a second selected point located between the butt joint and the end point;
  calculating, by the processor, a first approximate circle that includes the start point, the end point, and the first selected point, by performing the following steps:
    determining a first line between the start point and the first selected point and a second line between the first selected point and the end point;
    determining a first perpendicular line that is perpendicular to and bisects the first line and a second perpendicular line that is perpendicular to and bisects the second line;
    determining a first intersection point where the first perpendicular line and the second perpendicular line intersect; and
    defining the first approximate circle having a first center at the first intersection point and passing through the start point, the end point and the first selected point; and
  calculating, by the processor, a second approximate circle that includes the start point, the end point, and the second selected point, by performing the following steps:
    determining a third line between the start point and the second selected point and a fourth line between the second selected point and the end point;
    determining a third perpendicular line that is perpendicular to and bisects the third line and a fourth perpendicular line that is perpendicular to and bisects the fourth line;
    determining a second intersection point where the third perpendicular line and the fourth perpendicular line intersect; and
    defining the second approximate circle having a second center at the second intersection point and passing through the start point, the end point and the second selected point; and
  calculating, by the processor, a first differential distance in an X-axis direction between the first center of the first approximate circle and the second center of the second approximate circle and a second differential distance in a Z-axis direction between the first center and the second center and using the first and second differential distances as indices representing the shape of the butt joint.

6. The quality control method for welded steel pipes using the method for detecting a shape of a butt joint of a welded steel pipe according to claim 5, further comprising:
  comparing the first differential distance in the X-axis direction between the first center of the first approximate circle and the second center of the second approximate circle and the second differential distance in the Z-axis direction between the first center and the second center, with respective predetermined threshold values, so as to judge whether the shape of the butt joint of the welded steel pipe is acceptable or not.

7. A quality control apparatus for welded steel pipes, the apparatus comprising:
a non-contact displacement meter comprising:
a light projecting unit configured to irradiate a specific detection range including a butt joint of a welded steel pipe with a fan-shaped light beam or to scan the specific detection range with a spot light beam; and
a data output unit comprising a lens and an image sensor, the data output unit configured to receive light reflected from the specific detection range irradiated or scanned with the light beam from the light projecting unit and to output, based on the reflected light, geometric coordinate data representing changes in position and shape of the butt joint; and
an arithmetic processor comprising:
an approximate circle calculating/processing unit configured to:
select, from the geometric coordinate data obtained by the non-contact means, coordinates of a start point and an end point of the specific detection range, a first selected point located between the start point and the butt joint, and a second selected point located between the butt joint and the end point;
determine a first line between the start point and the first selected point and a second line between the first selected point and the end point;
determine a first perpendicular line that is perpendicular to and bisects the first line and a second perpendicular line that is perpendicular to and bisects the second line;
determine a first intersection point where the first perpendicular line and the second perpendicular line intersect;
calculate a first approximate circle having a first center at the first intersection point and passing through the start point, the end point, and the first selected point;
determine a third line between the start point and the second selected point and a fourth line between the second selected point and the end point;
determine a third perpendicular line that is perpendicular to and bisects the third line and a fourth perpendicular line that is perpendicular to and bisects the fourth line;
determine a second intersection point where the third perpendicular line and the fourth perpendicular line intersect;
calculate a second approximate circle having a second center at the second intersection point and passing through the start point, the end point, and the second selected point; and
average the first approximate circle and the second approximate circle so as to calculate an imaginary circle and calculate, as a difference value, a maximum deviation of the first approximate circle or the second approximate circle from the imaginary circle in a thickness direction of the welded steel pipe; and
a judgment processing unit configured to compare the difference value calculated by the approximate circle calculating/processing unit, with a predetermined threshold value, so as to judge whether the shape of the butt joint of the welded steel pipe is acceptable or not.

8. A quality control apparatus for welded steel pipes, the apparatus comprising:
a non-contact displacement meter comprising:
a light projecting unit configured to irradiate a specific detection range including a butt joint of a welded steel pipe with a fan-shaped light beam or to scan the specific detection range with a spot light beam; and
a data output unit comprising a lens and an image sensor, the data output unit configured to receive light reflected from the specific detection range irradiated or scanned with the light beam from the light projecting unit and to output, based on the reflected light, geometric coordinate data representing changes in position and shape of the butt joint; and
an arithmetic processor comprising:
an approximate circle calculating/processing unit configured to:
select, from the geometric coordinate data obtained by the non-contact means, coordinates of a start point and an end point of the specific detection range, a first selected point located between the start point and the butt joint, and a second selected point located between the butt joint and the end point;
determine a first line between the start point and the first selected point and a second line between the first selected point and the end point;
determine a first perpendicular line that is perpendicular to and bisects the first line and a second perpendicular line that is perpendicular to and bisects the second line;
determine a first intersection point where the first perpendicular line and the second perpendicular line intersect;
calculate a first approximate circle having a first center at the first intersection point and passing through the start point, the end point, and the first selected point; and
determine a third line between the start point and the second selected point and a fourth line between the second selected point and the end point;
determine a third perpendicular line that is perpendicular to and bisects the third line and a fourth perpendicular line that is perpendicular to and bisects the fourth line;
determine a second intersection point where the third perpendicular line and the fourth perpendicular line intersect;
calculate a second approximate circle having a second center at the second intersection point and passing through the start point, the end point, and the second selected point; and
calculate a distance between the first center of the first approximate circle and the second center of the second approximate circle; and
a judgment processing unit configured to compare the distance calculated by the approximate circle calculating/processing unit, with a predetermined threshold value, so as to judge whether the shape of the butt joint of the welded steel pipe is acceptable or not.

9. A quality control apparatus for welded steel pipes, the apparatus comprising:
a non-contact displacement meter comprising:
a light projecting unit configured to irradiate a specific detection range including a butt joint of a welded steel pipe with a fan-shaped light beam or to scan the specific detection range with a spot light beam; and a data output unit comprising a lens and an image sensor, the data output unit configured to receive light reflected from the specific detection range irradiated or scanned with the light beam from the light projecting unit and to output, based on the reflected light, geometric coordinate data representing changes in position and shape of the butt joint; and an arithmetic processor comprising:
  an approximate circle calculating/processing unit configured to:
    select, from the geometric coordinate data obtained by the non-contact means, coordinates of a start point and an end point of the specific detection range, a first selected point located between the start point and the butt joint, and a second selected point located between the butt joint and the end point;
    determine a first line between the start point and the first selected point and a second line between the first selected point and the end point;
    determine a first perpendicular line that is perpendicular to and bisects the first line and a second perpendicular line that is perpendicular to and bisects the second line;
    determine a first intersection point where the first perpendicular line and the second perpendicular line intersect;
    calculate a first approximate circle having a first center at the first intersection point and passing through the start point, the end point, and the first selected point;
    determine a third line between the start point and the second selected point and a fourth line between the second selected point and the end point;
    determine a third perpendicular line that is perpendicular to and bisects the third line and a fourth perpendicular line that is perpendicular to and bisects the fourth line;
    determine a second intersection point where the third perpendicular line and the fourth perpendicular line intersect;
    calculate a second approximate circle having a second center at the second intersection point and passing through the start point, the end point, and the second selected point; and
    calculate a first differential distance in an X-axis direction between the first center of the first approximate circle and the second center of the second approximate circle and a second differential distance in a Z-axis direction between the first center and the second center; and
  a judgment processing unit configured to:
    compare the first differential distance in the X-axis direction between the first center of the first approximate circle and the second center of the second approximate circle and the second differential distance in the Z-axis direction between the first center and the second center, with respective predetermined threshold values, so as to judge whether the shape of the butt joint of the welded steel pipe is acceptable or not.

* * * * *